Nov. 1, 1932.   K. R. LIEBERKNECHT   1,886,259
BRACKET FOR ELECTRIC MOTORS
Filed April 17, 1930   2 Sheets-Sheet 1
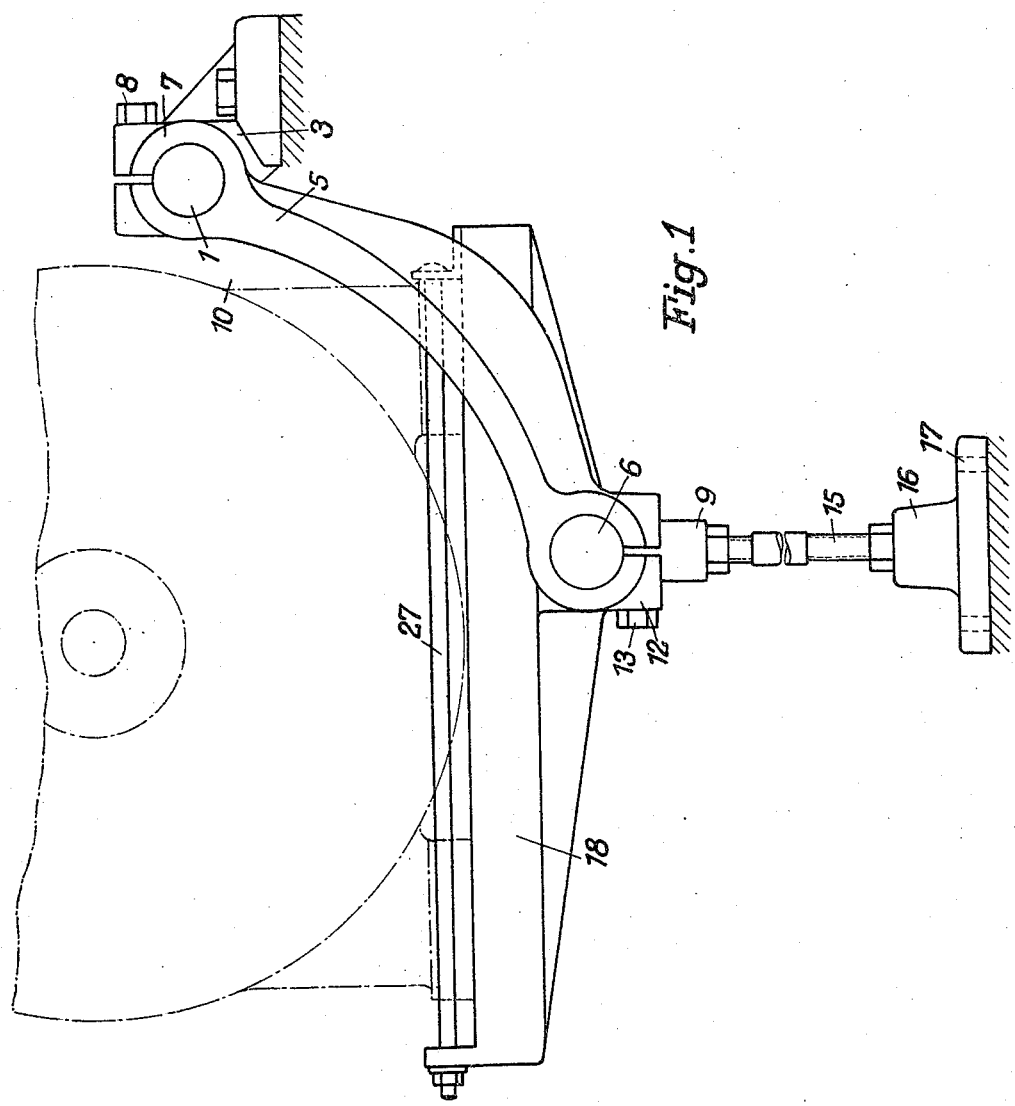
Inventor:

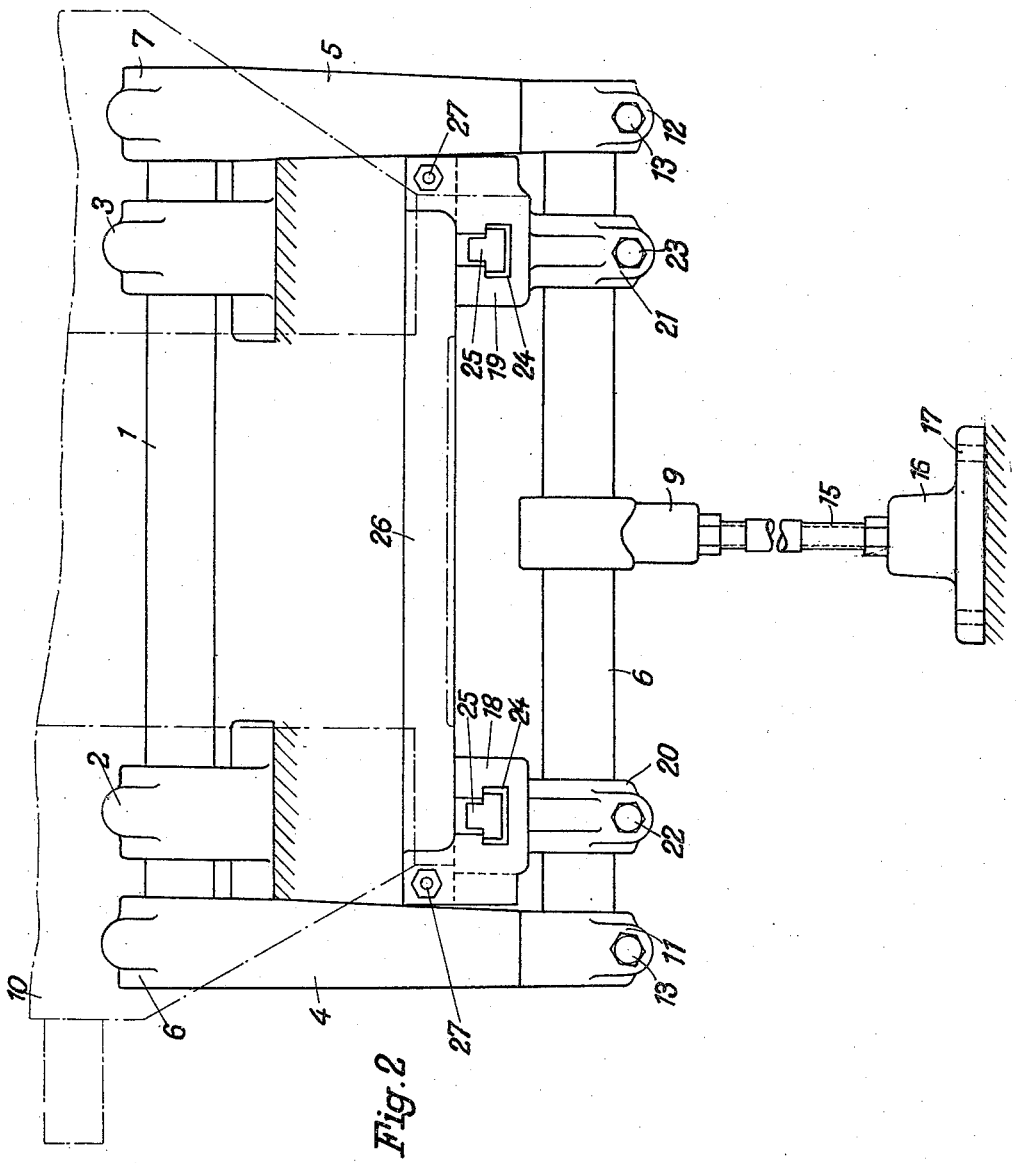

Patented Nov. 1, 1932

1,886,259

UNITED STATES PATENT OFFICE

KARL RICHARD LIEBERKNECHT, OF OBERLUNGWITZ, GERMANY

BRACKET FOR ELECTRIC MOTORS

Application filed April 17, 1930, Serial No. 445,122, and in Germany February 26, 1929.

This invention relates to a bracket for electric motors intended for direct driving of machines. It has for its object to improve the constructional shape of these brackets, so that the motors can be purchased separately or independently of the machine. These brackets can therefore be used for the most various types of motors of any origin and from any country independently of the standards existing in that country without auxiliary means being necessary. Consequently the main object of the invention is, to produce an adjustable standard type of bracket, which is able to adapt itself to the measurements determining the position of the motor axle which are dependent upon the transmission conditions as also the kind of drive, such as spur wheel—or chain-drive, including the necessary auxiliary devices such as tensioning devices.

Besides these advantages such a uniform type has the advantage of being cheap to produce.

The essential constructional feature consists in that the bracket is adjustable in horizontal and vertical direction, both as a whole as also its parts, to the size of the motor to be placed thereon, in such a manner that in any case the pinion for the power transmission occupies the same position.

An embodiment of the invention is illustrated by way of example in the accompanying drawings in which:

Fig. 1 shows the bracket in side elevation and

Fig. 2 in front elevation in the position for use, the motor being indicated in dot dash lines.

A horizontal shaft 1 is journaled in clamping bearings 2 and 3 of the machine, on which shaft the bracket is swivably or tippably suspended. Arms 4 and 5 are adjustably mounted by means of clamping bearings 6' and 7 on the ends of the shaft 1. After adjustment the clamping bosses can be fixed on the shaft 1 by tightening bolts 8. The arms 4 and 5 are consequently adjustable both as regards the distance the one from the other as also in height according to the shape and size of the motor 10 which is to be used. The lower ends of the arms 4 and 5 hold a horizontal axle 6 in similar clamping bearings 11 and 12, which axle can also be fixed by tightening the nuts 13. An adjustable support 9 is mounted on the axle 6, which support can be lengthened and shortened, according to the desired height and setting of the axle 6, by turning a spindle 15 in known manner. The foot 16 of the support may have continuous holes 17 for fixing to the floor by means of bolts. As a rule however the weight of the motor 10 will be sufficient for holding it in position.

Near the ends of the axle 6 bars 18 and 19 are adjustably arranged by means of lower clamping bearings 20 and 21 adapted to be fixed with the aid of bolts 22 and 23. The bars 18 and 19 have T-shaped longitudinal grooves 24 for accommodating corresponding T-shaped heads 25 of the fastening bolts for the motor 10 shown in dot dash lines in the drawings.

The new bracket operates as follows:

For displacing the resting surface of the bars 18 and 19 for the motor in vertical direction, first the clamping bolts 8 of the clamping bearings 2 and 3 are loosened, after which the support 9 is adjusted to the desired height by turning the spindle 15 and then the position of the bearing surface is secured by again tightening the clamping screws 8. However owing to the height adjustment the horizontal position of the bars 18 and 19 has been disturbed. This is again rectified by loosening the bolts 13 of the lower clamping bosses 11 and 12 and by bringing the bars 18 and 19 into their horizontal position by turning the axle 6 after which they are locked in position again by tightening the bolts 13.

In order to adapt the bracket for the differently positioned fastening holes of the different motors, both as regards their longitudinal and width spacing, the distance between the bars 18 and 19 is first set on the axle 6 according to the size of the motor, and the motor is then fastened in the desired distance from the shaft 1 by means of the fastening bolts with T-shaped heads 25.

If it is desired to arrange the bracket for restretching the chain of a motor provided with chain-drive, a further bar 26 is arranged in transverse direction on the rails 18 and 19, this bar 26 being displaceable in the longitudinal direction of the bars 18 and 19 by means of long screw bolts 27 thereby carrying along the motor mounted thereon.

The motor when fitted can also be displaced, after loosening the clamping bolts 8, in axial direction together with the shaft 1 and the arms 4 and 5 situated thereon as well as the bars 18 and 19, which is very advantageous for accurately adjusting the motor in the case of chain drive. The bracket is thus so constructed that it can be used for different types of motors without any subsequent work such as boring of holes, adjusting by any kind of subsequent work or use of washers and the like.

I claim:—

On a flat hosiery frame a new supporting arrangement for connecting electric motors to the knitting machine in such a manner that they are adjustable in the case of motors of different sizes so that their axles are always in the same position, comprising in combination with bearings of the flat hosiery frame, an axle arranged in said bearings, clamping bosses of said bearings adapted to fix said axle, arms fixably arranged on said axle, clamping bosses on the free ends of said arms, a second axle journaled in said clamping bosses and shiftable therein, supporting and connecting parts for the motors adjustably and fixably arranged on said second axle adapted to allow said clamping bosses to be shifted individually and also all together to allow said bosses to turn or move laterally individually and in common and also with said arms and said connecting parts for the motor, and a vertically adjustable carrying support adapted to relieve the entire supporting device.

In testimony whereof I affix my signature.

KARL RICHARD LIEBERKNECHT.